(12) United States Patent
Jun

(10) Patent No.: US 8,402,274 B2
(45) Date of Patent: Mar. 19, 2013

(54) SYSTEM AND METHOD OF SHARING CONTENTS DATA IN NETWORK

(75) Inventor: Hae-sik Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1811 days.

(21) Appl. No.: 11/386,872

(22) Filed: Mar. 23, 2006

(65) Prior Publication Data

US 2006/0218401 A1 Sep. 28, 2006

(30) Foreign Application Priority Data

Mar. 24, 2005 (KR) ........................ 10-2005-0024547

(51) Int. Cl.
H04L 29/06 (2006.01)
H04L 9/32 (2006.01)
G06F 7/04 (2006.01)

(52) U.S. Cl. ............ 713/170; 713/155; 713/171; 726/4; 726/21

(58) Field of Classification Search .................. 713/170, 713/155, 171; 726/26, 4, 21
See application file for complete search history.

(56) References Cited

U.S. PATENT DOCUMENTS

| 5,948,136 | A * | 9/1999 | Smyers ......................... 710/107 |
| 6,792,451 | B1 | 9/2004 | Tomiyama |
| 7,039,391 | B2 * | 5/2006 | Rezvani et al. ............... 455/411 |
| 7,075,672 | B2 * | 7/2006 | Onishi et al. ................. 358/1.15 |
| 7,143,443 | B2 * | 11/2006 | Song et al. ..................... 726/29 |
| 7,801,819 | B2 * | 9/2010 | Swenson et al. ................ 705/52 |
| 2002/0010785 | A1 * | 1/2002 | Katsukawa et al. ........... 709/229 |
| 2002/0047916 | A1 | 4/2002 | Miyagi et al. |
| 2002/0087690 | A1 * | 7/2002 | Hepper et al. ................ 709/225 |
| 2002/0112162 | A1 * | 8/2002 | Cocotis et al. ................ 713/176 |
| 2002/0115454 | A1 | 8/2002 | Hardacker |
| 2003/0105846 | A1 * | 6/2003 | Zhao et al. .................... 709/221 |
| 2004/0162870 | A1 * | 8/2004 | Matsuzaki et al. ............ 709/200 |
| 2004/0204093 | A1 | 10/2004 | Imaeda |
| 2004/0205766 | A1 * | 10/2004 | Lee et al. ...................... 719/311 |
| 2005/0155012 | A1 * | 7/2005 | Tayama et al. ................ 717/101 |
| 2007/0008568 | A1 * | 1/2007 | Senoh .......................... 358/1.14 |
| 2007/0070962 | A1 * | 3/2007 | Kilburn et al. ................ 370/338 |

FOREIGN PATENT DOCUMENTS

| JP | 2003-274103 A | 9/2003 |
| JP | 2003-348516 A | 12/2003 |
| JP | 2004-064509 A | 2/2004 |
| JP | 2004-077497 A | 3/2004 |
| KR | 10-2003-0092512 A | 12/2003 |
| KR | 10-2004-0047111 A | 6/2004 |
| KR | 10-2004-0076905 A | 9/2004 |
| KR | 10-2005-0015612 A | 2/2005 |
| KR | 10-2005-0021708 A | 3/2005 |

* cited by examiner

Primary Examiner — Mohammad W Reza
(74) Attorney, Agent, or Firm — Sughrue Mion, PLLC

(57) ABSTRACT

A technique for sharing contents data in a network. In order to easily share the contents data in the network without using a physical media apparatus or a personal computer, a contents data providing device for providing the contents data is registered in a server in the network, and after the registration, the contents data is transmitted to the server. A contents data receiving device for receiving the contents data is registered in the server, and after the registration, the registered contents data receiving device is authenticated. According to a result of the authentication, the contents data is transmitted to the contents data receiving device.

20 Claims, 5 Drawing Sheets

SYSTEM AND METHOD OF SHARING CONTENTS DATA IN NETWORK

CROSS-REFERENCE TO RELATED PATENT APPLICATION

This application claims priority from Korean Patent Application No. 10-2005-0024547, filed on Mar. 24, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to sharing contents data in a network, and more particularly, to a system and method of connecting a device for providing contents data with a device for receiving contents data by using a server in a network.

2. Description of Related Art

Conventional contents data sharing schemes are mainly divided into a scheme using physical media such as a memory card, a CD, and a DVD and a scheme of downloading the contents data from a computer and sharing the contents data though a server.

FIG. 1 is a schematic view showing a construction of a conventional contents data sharing scheme using physical media. In the scheme, a moving picture or a still picture is first obtained by a camera 10, and then, contents data is stored in portable media 20 such as a video tape and a DVD. After that, the contents data stored in the portable media is transferred to a playing apparatus 30 and reproduced by a display apparatus 40.

FIG. 2 is a schematic view showing a construction of a conventional contents data sharing scheme using an Internet server. The contents data sharing scheme shown in FIG. 2 shares by using an Internet server 50. In this scheme, a moving picture or a still picture is first obtained by a camera 60, and then, contents data is uploaded to the Internet server 50 by using a computer 70. The contents data stored in the Internet server 50 is then downloaded using a computer 80. The downloaded contents data is then displayed on a display 90.

As shown in FIG. 1, in the scheme using the physical media such as a CD and a flash memory, there is a transfer distance limitation, and since the media is used, the cost for sharing the contents data increases, in addition to much time being taken to share the contents data.

Also, as seen in FIG. 2, the contents data sharing scheme using an Internet server 50 requires transmitting from an apparatus such as a camcorder and a digital camera 60 to the computer 70 and direct uploading to the Internet server 50. Therefore, a user which is not skilled at using a computer has difficulty with the task, so that contents data sharing cannot smoothly be implemented.

SUMMARY OF THE INVENTION

The present invention provides a system and method of sharing contents data in a network capable of easily sharing digital contents data made with a personal image pickup apparatus such as a camcorder or a digital camera by a user without using a physical media apparatus or a personal computer.

According to an exemplary aspect of the present invention, there is provided a method of sharing contents data in a network, comprising: registering a contents data providing device; receiving the contents data from the contents data providing device; registering a contents data receiving device; authenticating the registered contents data receiving device; and transmitting the contents data to the contents data receiving device based on a result of the authenticating.

The method may further include: generating a space for sharing the contents data in the server. The registering of the contents data receiving device may include: receiving a request for an authentication key for registering the contents data receiving device by the contents data providing device; generating an authentication key by the server; transmitting the generated authentication key; and registering the contents data receiving device together with the transmitted authentication key in the server.

The method may further include: registering a device for receiving the authentication key in the server.

The transmitting of the generated authentication key may include: transmitting the generated authentication key to the device for receiving the authentication key.

The authenticating of the registered contents data receiving device may include: determining whether or not the authentication key registered together with the contents data receiving data matches the generated authentication key.

According to another exemplary aspect of the present invention, there is provided a method of sharing contents data in a network, comprising: registering a contents data providing device; generating a space for sharing the contents data in the server; and receiving the contents data from the contents data providing device.

According to another exemplary aspect of the present invention, there is provided a method of sharing contents data in a network, comprising: storing the contents data in a sever in the network; registering a contents data receiving device, which is to receive the contents data, in the server; authenticating the registered contents data receiving device; and transmitting the contents data to the contents data receiving device based on a result of the authenticating.

According to another exemplary aspect of the present invention, there is provided a system for sharing contents data in a network, comprising: a server for providing a space for sharing the contents data and authenticating a device which is to receive the contents data; a contents data providing device for transmitting the contents data to the server; and a contents data receiving device for receiving the contents from the server based on a result of the authentication.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Now, exemplary embodiments of the present invention will be described with reference to the accompanying drawings.

Figure 1:
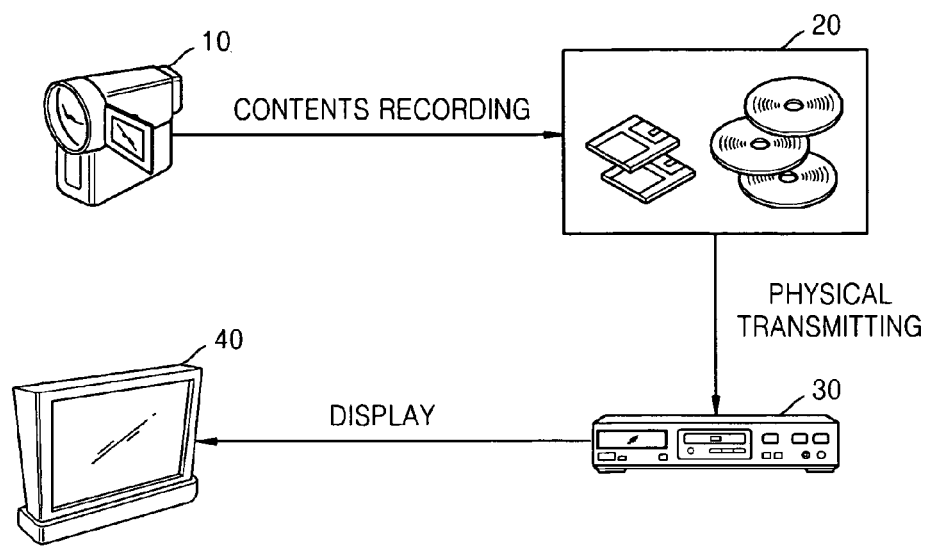
FIG. 1 is a schematic view showing a construction of a conventional contents data sharing scheme using physical media.
Figure 2:
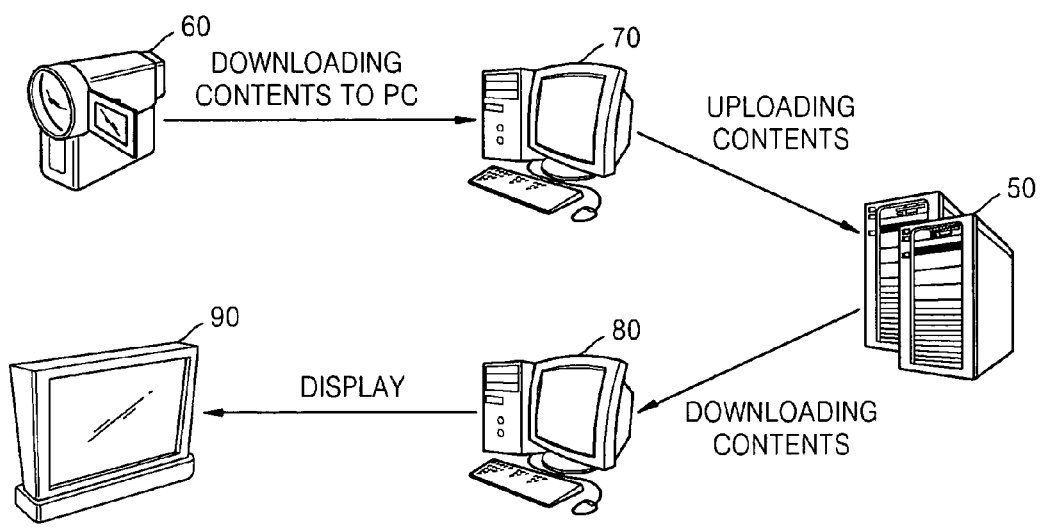
FIG. 2 is a schematic view showing a construction of a conventional contents data sharing scheme using an Internet server.
Figure 3:
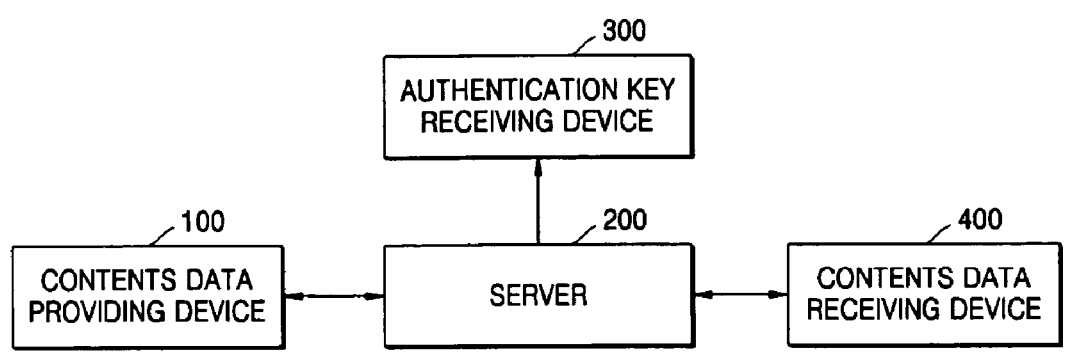
FIG. 3 is a schematic view showing a construction of a contents data sharing system according to an exemplary embodiment of the present invention.
Figure 4:
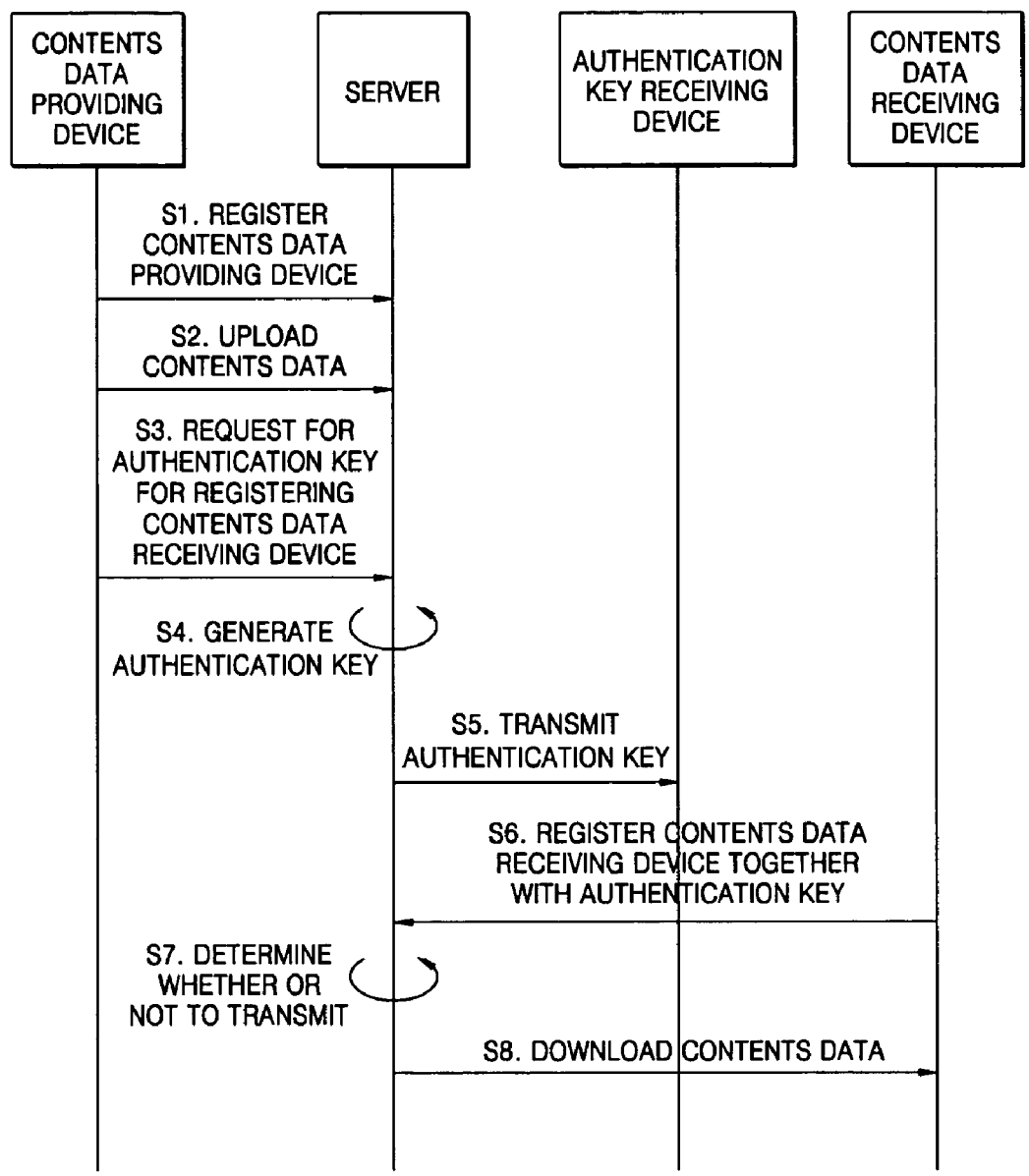
FIG. 4 is a view showing operations of the contents data sharing system shown in FIG. 3.

FIG. 3 is a schematic view showing a construction of a contents data sharing system according to an exemplary embodiment of the present invention, and FIG. 4 is a view showing operations of the contents data sharing system shown in FIG. 3.

The contents data sharing system shown in FIG. 3 includes a contents data providing device 100, server 200, an authentication key receiving device 300, an a contents data receiving device 400.

First, the contents data providing device 100 is registered in the server 200. When the contents data providing device 100 accesses the server 200, contents data is uploaded. In an exemplary embodiment of the present invention, when the contents data providing device 100 is registered in the server 200, for example, a serial number thereof is registered.

In addition, the contents data providing device 100 performs a function of requesting an authentication key for authenticating the registration of the contents data receiving device 400.

The server 200 provides a space for sharing the contents data and performs a function of authenticating a device which is to receive the contents data.

The server 200 generates an authentication key in response to the authentication key request of the contents data providing device 100 and transmits the authentication key to the authentication key receiving device 300.

The server 200 authenticates registering of the contents data receiving device 400 by using the authentication key and downloads the contents data to the contents data receiving device 400 based on a result of the authentication.

The authentication key receiving device 300 receives the authentication key generated by the server 200. Although a mobile communication terminal such as a mobile phone is used in an exemplary embodiment of the present invention for the authentication key receiving device 300, other devices may be used. If the mobile phone is used, there is an advantage in that user authentication for a user of the contents data providing device 100 can be performed. The authentication key receiving device 300 also provides received authentication key to a user of the contents data receiving device 400.

The contents data receiving device 400 is registered together with the received authentication key in the server 200, and then, the contents data receiving device 400 receives contents data from the server based on a result of authentication of the server 200.

The contents data receiving device 400 may be a set top box for downloading the contents data and transmitting the contents data to a display apparatus, for example, and the set top box and the display apparatus may be combined with each other.

FIG. 4 further depicts operations of the contents data sharing system. Descriptions of the same components described in regard to FIG. 3 are omitted.

First, the contents data providing device 100 is registered in the server 200 (S1). After the registration, if the contents data providing device 100 accesses the server 200, the contents data is uploaded (S2). Next, the contents data providing device 100 sends a request for an authentication key for authenticating registration of the contents data receiving device 400 to the server 200 (S3).

The server 200 generates the authentication key (S4), and the authentication key generated by the server 200 is transmitted to the authentication key receiving device 300 (S5). The authentication key receiving device 300 provides the received authentication key to a user of the contents data receiving device 400.

After that, the contents data receiving device 400 is registered in the server 200, and at this time, the authentication key received by the authentication key receiving device 300 is also registered (S6).

The server 200 compares the generated authentication key with the registered authentication key to determine whether or not the contents data can be transmitted (S7). As a result of the determination, if the contents data can be transmitted, the contents data is transmitted from the server 200 to the contents data receiving device 400 (S8).

Figure 5:
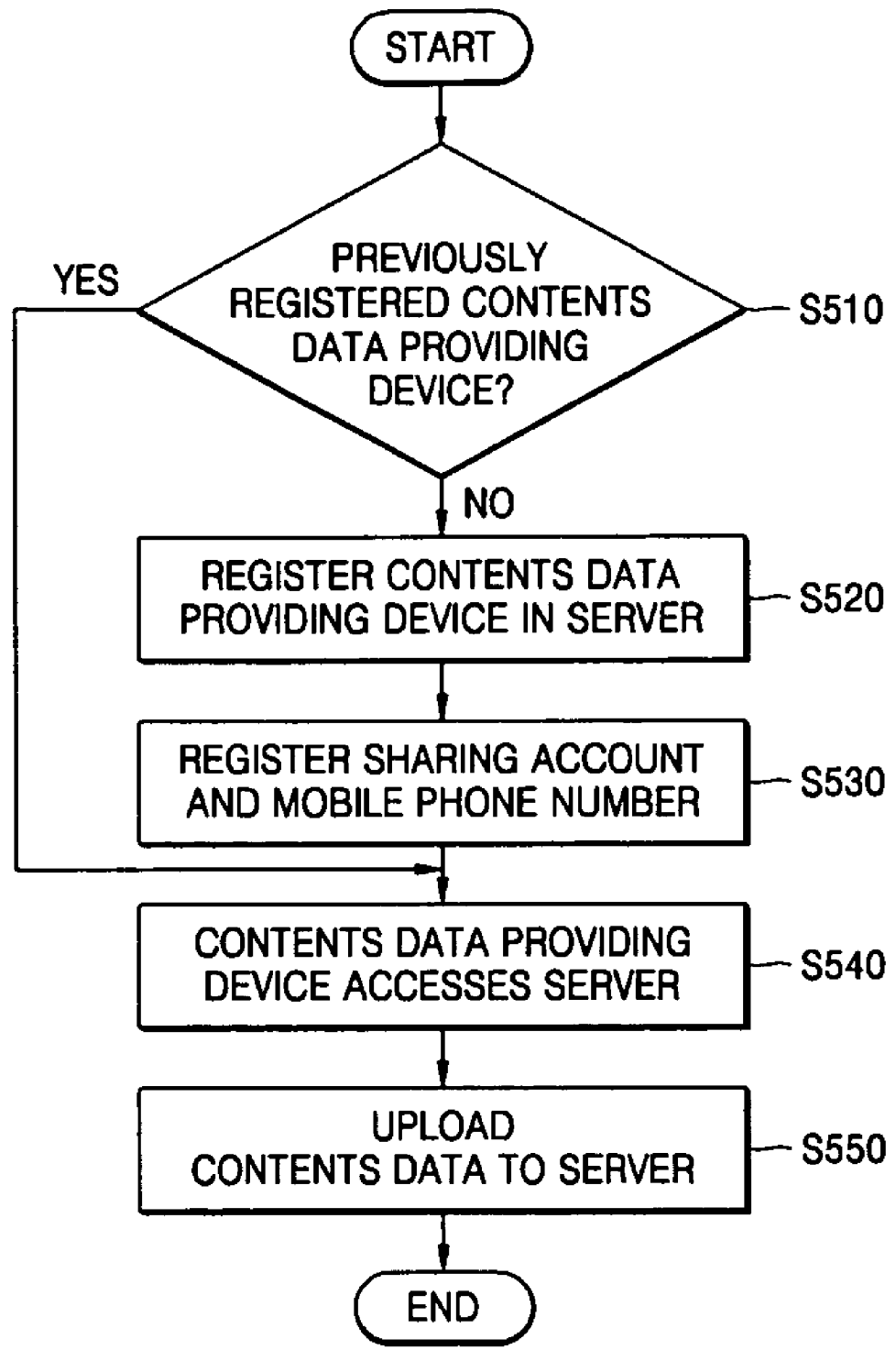
FIG. 5 is a flowchart showing processes of transmitting the contents data from the contents data providing device to the server in a contents data sharing method according to an exemplary embodiment of the present invention.

FIG. 5 is a flowchart showing processes of transmitting the contents data from the contents data providing device 100 to the server 200 in a contents data sharing method according to an exemplary embodiment of the present invention.

First, a process of determining whether or not the contents data providing device 100 is previously registered in the server 200 is performed (S510).

As a result of the determination in process S510, if the contents data providing device 100 is not registered in the server 200, the contents data providing device 100 is registered at that time in the server 200 (S520). If the contents data providing device 100 is previously registered, the following process S540 is performed.

Next, a sharing account, that is, a space for sharing the contents data is generated, and in order to receive an authentication key for authenticating the registering of the contents data receiving device 400 which is to receive the contents data, a mobile phone number, for example, is registered in the server 200 (S530).

Although a mobile communication terminal such a mobile phone is used to receive the authentication key in an exemplary embodiment, the present invention is not limited thereto. For example, in order to receive the authentication key, an e-mail address of a user can be registered in the server 200. Alternatively, in order to receive the authentication key, other receiving means may be used.

After the process S530 is performed, if the contents data providing device 100 accesses the server 200 (S540), the contents data generated by the contents data providing device 100 is uploaded to the server 200 (S550).

Figure 6:
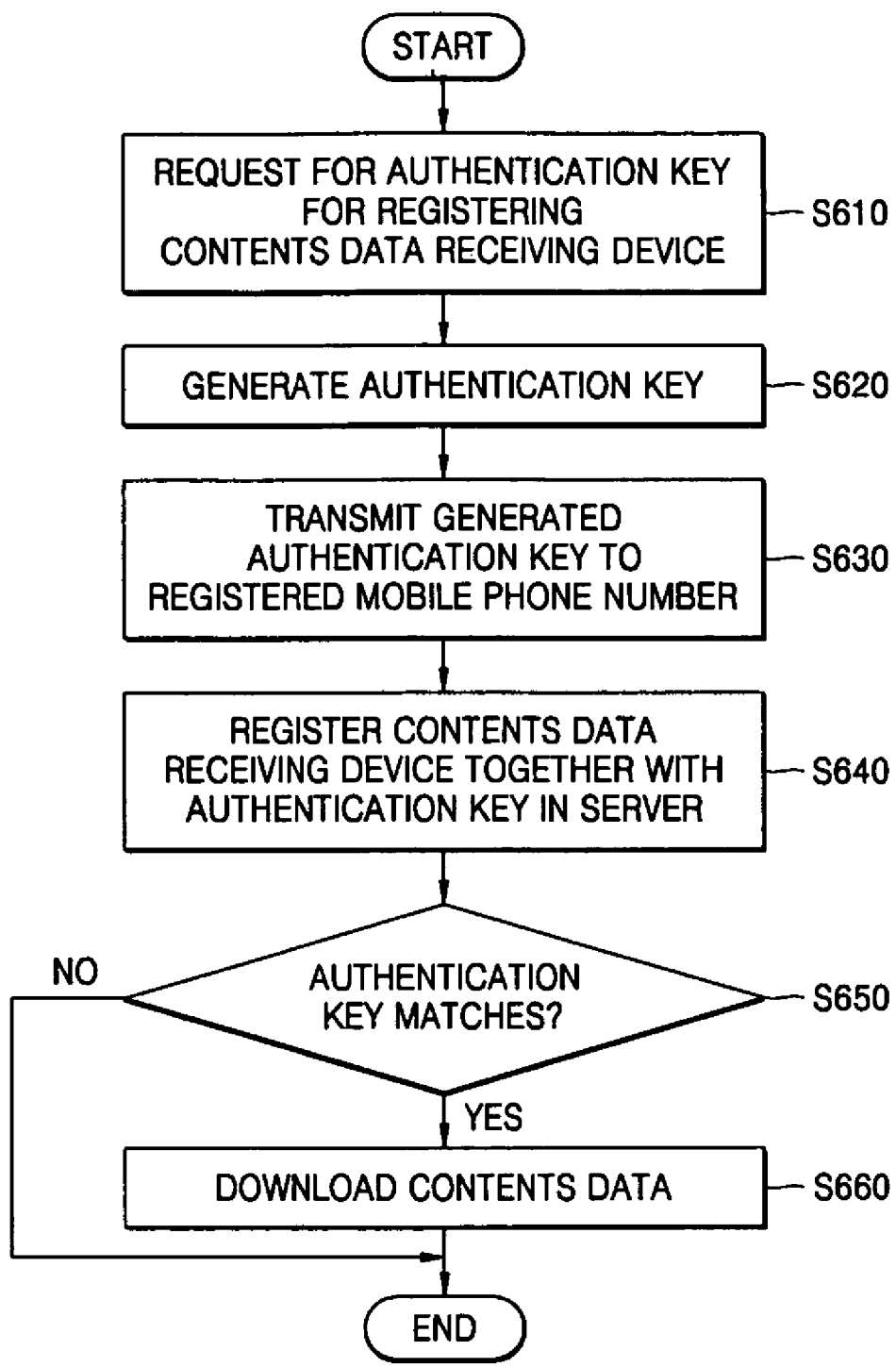
FIG. 6 is a flowchart showing processes of transmitting the contents data from the server to the contents data receiving device in the contents data sharing method according to an exemplary embodiment of the present invention.

FIG. 6 is a flowchart showing processes of transmitting the contents data from the server 200 to the contents data receiving device 400 in the contents data sharing method according to an exemplary embodiment of the present invention.

The contents data providing device 100 performs a process of requesting an authentication key for authenticating the registering of the contents data receiving device 400 which receives the contents data (S610).

In response to the authentication key request of the contents data providing device 100, the server 200 generates the authentication key (S620).

Next, a process of transmitting the authentication key generated by the server 200 to a mobile phone number registered in the server 200 is performed (S630). As shown in FIG. 6, although a mobile communication terminal such as a mobile phone is used in an exemplary embodiment of the present invention, the present invention is not limited thereto. For example, in order to receive the authentication key, an e-mail address of a user may be registered in the server 200. Alternatively, in order to receive the authentication key, other receiving means may be used. If the e-mail address is registered in the server 200, the authentication key is transmitted to the registered e-mail address.

When the contents data receiving device 400 is registered in the server 200, a process of registering the received authentication key in the server 200 is also performed (S640).

The server 200 determines whether or not the authentication key registered in the process S640 matches with the authentication key generated in the process S620 (S650). If the contents data receiving device 400 is proper one to receive the contents, the authentication key receiving device 300 receives the authentication key which is generated by the server 200. Thus, the authentication key registered in the process S640 matches with the authentication key generated in the process S620 when the contents data receiving device 400 is proper one to receive the contents.

If the authentication keys match with each other, a process of downloading the contents data from server 200 to the contents data receiving device 400 is performed (S660).

While the aforementioned contents data sharing system and method in a network according to the present invention has been particularly shown and described with reference to exemplary embodiments thereof, it will be understood by those skilled in the art that various changes in form and details may be made therein without departing from the spirit and scope of the present invention as defined by the appended claims.

As described above, according to a system and method of sharing contents data in a network of the present invention, it is possible to easily share the contents data by using a registering scheme through an authentication key without PC, and it is possible to share the contents with a specific counter party.

What is claimed is:

1. A method of sharing contents data in a network, the method comprising by a server:
   registering a contents data providing device;
   receiving the contents data from the contents data providing device;
   registering a contents data receiving device;
   authenticating the contents data receiving device which is registered; and
   transmitting the contents data to the contents data receiving device based on a result of the authenticating,
   wherein the registering the contents data receiving device comprises:
   generating an authentication key by the server in response to a request to generate the authentication key;
   transmitting the generated authentication key by the server; and
   registering the contents data receiving device together with the authentication key which is transferred from the server.

2. The method according to claim 1, further comprising: generating a space for sharing the contents data.

3. The method according to claim 1, wherein the registering the contents data receiving device further comprises:
   receiving a request from the contents data providing device for an authentication key for registering the contents data receiving device.

4. The method according to claim 1, further comprising: registering a device for receiving the authentication key in the server.

5. The method according to claim 4, wherein the authentication key which is generated is transmitted to the device for receiving the authentication key.

6. The method according to claim 1, wherein the authenticating the contents data receiving device comprises determining whether the authentication key registered with the contents data receiving device matches the authentication key which is generated.

7. The method according to claim 4, wherein the device for receiving the authentication key is a different device from the contents data receiving device.

8. A method of sharing contents data in a network, comprising by a contents data providing device:
   registering the contents data providing device to a server; and
   transmitting the contents data from the contents data providing device to the server, the content data to be transmitted to an authenticated contents data receiving device,
   transmitting a request from the contents data providing device to the server to generate an authentication key to be used for registering and authenticating, by the server, the contents data receiving device.

9. The method according to claim 8, wherein an authentication key is generated and transmitted to a device for receiving the authentication key by the server.

10. The method according to claim 8, further comprising:
    registering a device for receiving the authentication key to the server.

11. The method according to claim 10, wherein the device for receiving the authentication key is a mobile communication terminal.

12. The method according to claim 9, wherein the device for receiving the authentication key is a different device from the contents data receiving device.

13. A system for sharing contents data in a network, comprising:
    a server which authenticates a device which is to receive the contents data;
    a contents data providing device which transmits the contents data to the server; and
    a contents data receiving device which receives the contents from the server based on a result of the authentication,
    wherein the server generates an authentication key for registering the contents data receiving device in response to a request to generate the authentication key and transmits the authentication key,
    wherein the contents data receiving device is registered in the server together with the authentication key which is transmitted from the server.

14. The system according to claim 13, wherein the contents data providing device is registered in the server, and when the contents data providing device accesses the server, the contents data is transmitted.

15. The system according to claim 13, wherein the authentication key is generated in response to a request of the contents data providing device.

16. The system according to claim 13, further comprising an authentication key receiving device which receives the generated authentication key.

17. The system according to claim 13, wherein the server compares the authentication key which is generated with the authentication key which is registered to authenticate the contents data receiving device.

18. The system according to claim 16, wherein the authentication key receiving device is a mobile communication terminal.

19. The system according to claim 16, wherein the authentication key receiving device provides the authentication key to a user of the contents data receiving device.

20. The system according to claim 16, wherein the authentication key receiving device is a different device from a contents data receiving device.

* * * * *